(12) United States Patent
Klint et al.

(10) Patent No.: US 9,630,371 B2
(45) Date of Patent: Apr. 25, 2017

(54) MAGNETISABLE INK

(75) Inventors: Ann-Charlotte Klint, Löddeköpinge (SE); Martin Berntsson, Löberöd (SE); Fredrik Erikson, Svedala (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 302 days.

(21) Appl. No.: 13/322,630

(22) PCT Filed: May 4, 2010

(86) PCT No.: PCT/SE2010/000120
§ 371 (c)(1),
(2), (4) Date: Nov. 28, 2011

(87) PCT Pub. No.: WO2010/138048
PCT Pub. Date: Dec. 2, 2010

(65) Prior Publication Data
US 2012/0077001 A1    Mar. 29, 2012

(30) Foreign Application Priority Data

May 29, 2009 (SE) ........................... 0900725

(51) Int. Cl.
| | |
|---|---|
| *B65B 3/26* | (2006.01) |
| *B65B 57/02* | (2006.01) |
| *B65B 61/02* | (2006.01) |
| *B31B 1/88* | (2006.01) |
| *C09C 1/24* | (2006.01) |

(Continued)

(52) U.S. Cl.
CPC ............. *B31B 1/88* (2013.01); *C09C 1/24* (2013.01); *C09D 7/1216* (2013.01); *C09D 7/1275* (2013.01); *C09D 7/1283* (2013.01); *C09D 11/03* (2013.01); *H01F 1/37* (2013.01); *H01F 1/44* (2013.01); *H01F 41/16* (2013.01); *B31B 2201/88* (2013.01); *C01P 2006/42* (2013.01); *C08K 3/22* (2013.01); *Y10T 428/24909* (2015.01)

(58) Field of Classification Search
USPC ................. 428/35.7; 324/207.12, 207.21
See application file for complete search history.

(56) References Cited

U.S. PATENT DOCUMENTS 3,237,973 A * 3/1966 Rumberger ............... 283/62
3,498,748 A * 3/1970 Greiner ................. 423/634
(Continued)

FOREIGN PATENT DOCUMENTS

| | | |
|---|---|---|
| DE | 103 01 107 A1 | 8/2004 |
| DE | 10301107 A1 | 8/2004 |

(Continued)

OTHER PUBLICATIONS

Extended European Search Report issued Feb. 4, 2013, by the European Patent Office in corresponding European Patent Application No. 10780869.3. (5 pages).
(Continued)

*Primary Examiner* — Ellen S Wood
(74) *Attorney, Agent, or Firm* — Buchanan Ingersoll & Rooney PC

(57) ABSTRACT

A magnetizable ink suitable for a packing material for forming food packages is disclosed. The ink comprises magnetizable particles; a solvent; and a binder.

19 Claims, 1 Drawing Sheet

(51) Int. Cl.
*C09D 7/12* (2006.01)
*C09D 11/03* (2014.01)
*H01F 1/37* (2006.01)
*H01F 1/44* (2006.01)
*H01F 41/16* (2006.01)
*C08K 3/22* (2006.01)

(56) References Cited

U.S. PATENT DOCUMENTS

| | | | |
|---|---|---|---|
| 4,923,749 A | | 5/1990 | Talvalkar |
| 5,047,291 A | | 9/1991 | Talvalkar et al. |
| 5,453,121 A | | 9/1995 | Nicholls et al. |
| 5,704,190 A | | 1/1998 | Kaneko et al. |
| 5,843,579 A | * | 12/1998 | Roth et al. .......... 428/32.84 |
| 2005/0287351 A1 | | 12/2005 | Johansson et al. |
| 2006/0150854 A1 | * | 7/2006 | Benninger et al. ........ 101/489 |
| 2010/0016137 A1 | * | 1/2010 | Benedetti et al. ........ 493/162 |
| 2012/0067953 A1 | | 3/2012 | Nilsson |
| 2012/0070633 A1 | | 3/2012 | Nilsson et al. |
| 2012/0070634 A1 | | 3/2012 | Holmström |
| 2012/0070638 A1 | | 3/2012 | Nilsson et al. |
| 2012/0073242 A1 | | 3/2012 | Nilsson et al. |
| 2012/0074234 A1 | | 3/2012 | Nilsson et al. |
| 2012/0076995 A1 | | 3/2012 | Nilsson et al. |

FOREIGN PATENT DOCUMENTS

| | | |
|---|---|---|
| EP | 0638618 A2 | 2/1995 |
| EP | 0705759 A1 | 4/1996 |
| EP | 0 929 474 B1 | 8/2001 |
| JP | 56-49768 A | 5/1981 |
| JP | 58-198575 A | 11/1983 |
| JP | 4-57214 A | 2/1992 |
| JP | H07-10108 A | 1/1995 |
| JP | H09-40896 A | 2/1997 |
| JP | H09-188357 A | 7/1997 |
| JP | 2000085033 A | 3/2000 |
| JP | 2005-525253 A | 8/2005 |
| JP | 2005-264074 A | 9/2005 |
| JP | 2008036957 A | 2/2008 |
| WO | 99/23181 A1 | 5/1999 |
| WO | 9923181 A1 | 5/1999 |
| WO | 2006/135314 A1 | 12/2006 |
| WO | WO 2006/135313 A1 | 12/2006 |

OTHER PUBLICATIONS

First Substantive Examination Report dated Jul. 22, 2013 issued by the Patent Office in Saudi Arabia in the counterpart application in Saudi Arabia (4 pgs).
Supplementary European Search Report and European Seach Opinion issued on Feb. 4, 2013, by the European Patent Office in counterpart EP Patent Application No. 10780869.3 (4 pgs).
Communication from the Examining Division and Annex to Communication issued Dec. 20, 2013, by the European Patent Office in counterpart EP Patent Application No. 10780869.3 (3 pgs).
International Search Report (PCT/ISA/210) issued on Sep. 7, 2010, by Swedish Patent Office as the International Searching Authority for International Application No. PCT/SE2010/000120.

* cited by examiner

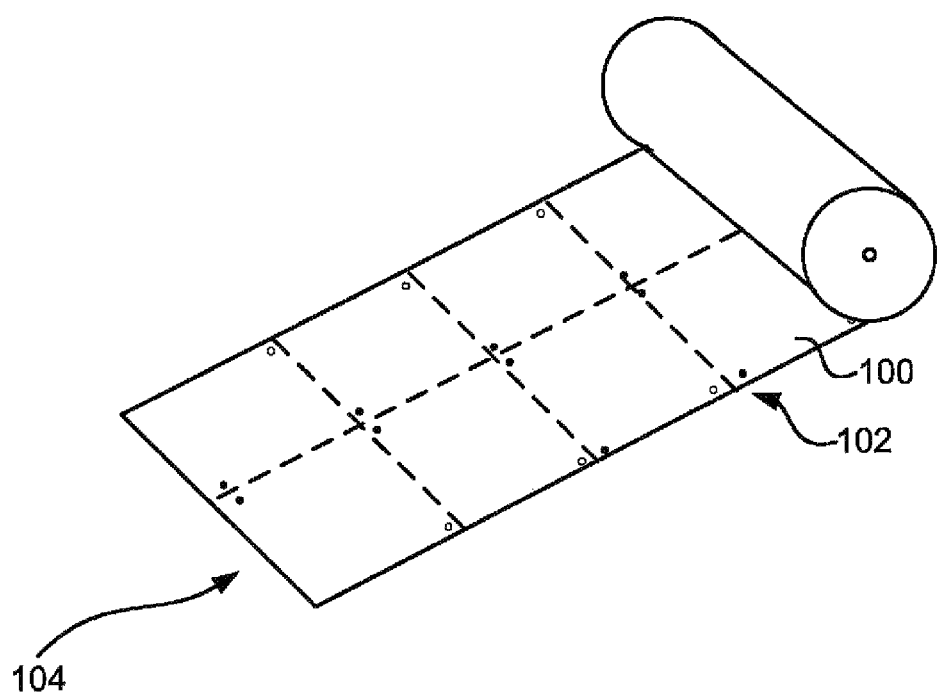

MAGNETISABLE INK

TECHNICAL FIELD

The present invention relates to a magnetisable ink suitable for a packing material for providing magnetisable portions on the packaging laminate.

BACKGROUND

Within packaging technology where a packaging container is formed from a packaging laminate, it is known to provide the packaging laminate as a web which prior or during packaging is formed to the packaging container. Guiding marks, e.g. for optical reading has been provided to guide operations when finishing the package, such as forming, sealing, folding, etc. Such guiding marks are sometimes referred to as register marks. The register mark for optical reading is provided during printing of the packing laminate, where e.g. decoration or product information is printed on the packaging laminate. A problem with such register marks is that they consume a non-negligible area of what becomes the exterior of the package. A further problem is that such a register mark has to rely on the printing being well aligned with other operations performed on the web. It is therefore a desire to provide an improved provision of marking of web of packaging laminate. An approach for providing such marks may be to provide magnetisable portions on the packaging material such that magnetic marks can be provided. Therefore, it is further a desire to enable provision of such magnetisable portions.

SUMMARY

The present invention is based on the understanding that magnetic marking can be provided on a packaging laminate. Storing information in a magnetic recording medium in packing material has been suggested in e.g. EP 705759 A1. In the present disclosure, it is suggested that one or more spots per intended package to be formed from the web is provided by magnetisable ink, wherein the ink comprises magnetisable particles such that magnetic marking is enabled.

According to a first aspect, there is provided a magnetisable ink suitable for a packing material for forming food packages, comprising magnetisable particles; a solvent; and a binder.

In a preferred embodiment the magnetisable ink is adapted for high speed printing of a web of a packaging laminate comprising a base layer of paper or paperboard, in which said magnetisable ink is suitable for printing directly on the paper or paperboard layer. In particular, said magnetisable ink is adapted to be printed on the surface of said paper or paperboard layer which is intended to be facing towards the interior of a food package manufactured from said packaging laminate.

The magnetisable particles may be chosen from the group consisting of maghemite and hematite.

The binder may be chosen from the group consisting of acrylate, acrylics such as styrene acrylic copolymer, polyurethane, nitrocellulose, polyamide and latex. The binder may comprise two of the group, wherein one serves as a dispersant such that the magnetisable particles are evenly dispersed in the ink and the other serves as an adhesive to the laminate.

The amount of binder may be between 20 and 60 percent of weight of the ink, preferably between 40 and 60 percent, preferably between 50 and 55 percent.

The magnetisable ink may further comprise additives, such as waxes and/or antifoaming agent. The waxes may comprise any of a group comprising carnauba, paraffin, polyethylene, polypropylene, silicone, polyamide, ethylene vinyl acetate, ethylene butyl acetate, ethylene acrylic acid and polytetrafluoro ethylene. The antifoaming agent may comprise polyglycol, mineral oil, polysiloxanes, hydrophobic silica, silicone or mineral oil.

The solvent may comprise any of a group comprising ethoxy propanol, n-propanol, ethanol, ethylic acetate, water, iso-propanol, glycol, or a retarder solvent.

The amount of magnetisable particles may be between 15 and 40 percent by weight of the ink, preferably 30-35 percent by weight.

The size of the magnetisable particles may be between 0.1 and 2.5 µm, preferably between 0.1 and 0.8 µm or preferably between 0.4 and 1.5 µm, preferably about 0.3 µm or preferably about 1 µm.

BRIEF DESCRIPTION OF DRAWINGS

FIG. 1 schematically illustrates a web of packaging material where spots of magnetisable ink according to an embodiment is provided as magnetisable portions on the packaging material.

DETAILED DESCRIPTION

A magnetisable ink is provided such that magnetisable portions can be provided on a packaging laminate, which packaging laminate is to be used for forming e.g. food packages such as beverage and food containers, or containers for basic or additive products for preparing food or beverages. The ink comprises magnetisable particles for provision of the magnetic features of the magnetisable portions.

The ink further comprises a solvent. Purpose of the solvent can be to keep a system for distributing the ink flowing during printing. The solvent can be water-based or monomer-based. Examples on solvents are ethanol, ethylic acetate, water, iso-propanol, glycol, or a retarder solvent.

The ink further comprises a binder, such as acrylate, styrene acrylic copolymer, polyurethane, nitrocellulose, polyamide, or latex. The binder can comprise a mix of several components, e.g. of those mentioned above, in order to give the ink needed properties. The properties to be considered are help to disperse and stabilise magnetic particles in the ink, to transport the magnetic particles during a printing process, to give adhesion to a substrate on which the print is made, i.e. on a layer of the laminate. Further properties to be considered are protection of the magnetic particles after printing and providing proper printing properties. For example, one component of the binder can serve as a dispersant for dispersing the magnetic particles evenly in the ink, while another can serve as an adhesive to the laminate, etc. For providing an ink that is suitable for high speed printing, the amount of binder can be between 20 and 60 percent of the weight of the ink, i.e. wet weight. A suitable amount has been found to be between 40 and 60 percent. Using between 50 and 55 percent has worked well.

The ink can further comprise additives, such as waxes and/or antifoaming agent. Suitable waxes can be polyethylene, polypropylene or polytetrafluoro ethylene, polysiloxanes, polyamide, ethylene vinyl acetate, ethylene butyl acetate, ethylene acrylic acid, etc. The amount of wax may be varied, but should be enough to prevent the ink from setting-off or smudge. Suitable antifoaming agents can be silicone or mineral oils. The amount of antifoaming agent should be enough for preventing the ink from foaming during printing on the moving web, especially at high-speed printing.

The ink can be prepared by mixing the magnetisable particles with the binder, e.g. by continuous shearing or stirring. The adding of particles, which may be made in portions, may be interrupted when the mix reaches about 40 to 50 degrees centigrade, and immediately adding any additives, e.g. the antifoam agent and/or the waxes, and the fluid such that the ready-to-use ink is provided.

The magnetisable particles can be hematite or maghemite, or a combination thereof. These minerals are suitable for food packages since there is no restriction whether they may be in contact with the foodstuffs. The amount of magnetisable particles is between 15 and 40 percent weight of the ink, preferably 30-35 percent by weight.

The size of the magnetisable particles, i.e. a length across the particle, a diameter, etc. depending on the assumed shape of the particle, has been found to give more or less beneficial properties of a remaining magnetic field (remanence) when a magnetic mark is applied on a spot printed by the magnetisable ink. Smaller particles, i.e. in the magnitude of 0.1 μm, may be more dispersed, but each particle can of course hold less remaining magnetic field (remanence). Also, depending on the choice of binder, solvent, etc., the dispersion of such small particles may in practice be an issue, where lumping of the small particles may be an issue during preparation and handling of the ink. On the other hand, larger particles, i.e. in the magnitude of one or a few μm, may of course not be that dispersed as the smaller particles, but each particle can hold more remaining magnetic field (remanence), and the lumping of particles will be less apparent. A further increase of particle size has been found not to increase the aggregate remaining magnetic field (remanence) that can be held with the amount of ink of the spots kept constant. Thus a suitable the size of the magnetisable particles can be between 0.1 and 2.5 μm. Preferable sizes can be between 1 and 8 μm for one embodiment, or between 0.4 and 1.5 μm for a further embodiment. A small particle approach can for example be having particles with a size of about 0.3 μm to provide a suitable trade-off between dispersion and the issue of lumping. Another approach can be to have particles with a size of about 1 μm to enable each particle to provide a significant amount of magnetic field and to minimize the issue of lumping. A further embodiment can be to have a particle size of about 0.4, 0.5, 0.6 or 0.7 μm to provide a little of both of the benefits for the two other examples given above. Here, the size given as "about" should be interpreted in the light of both that the shape of the particles may not give a certain geometric distance to measure, and that there is a natural spread in the sizes of the particles due to the preparation of them. Say for example that a particle size of a half micrometer is chosen, but the particles are prepared by grinding and have a slightly irregular shape. Thus, an average particle can then be a half micrometer across its largest available direction, while it only is 0.35 μm across its smallest direction. Further, for the largest direction, 80 percent of the particles may have a spread between 0.45 and 0.55 μm, while the remaining 20 percent may be out of that range, especially towards smaller particles caused by the grinding. The example is of course applicable for any chosen size. The spread can also be decreased by screening the particles after grinding.

FIG. 1 illustrates web 100 of packaging material, where a plurality of magnetisable portions 102 are provided. The magnetisable portions are preferably distributed upon printing them such that there is at least one magnetisable portion 102 per package 104 to be formed from the packaging material. For reducing the consumption of the magnetic material, i.e. magnetisable ink consumption, the magnetisable portions can be provided as spots or the like at parts where magnetic marks are intended to be positioned. Since there is a limited precision in positioning between printing and the assignment of the magnetic mark, cf. the problem with optical marks, the spots are preferably slightly larger than the actual size needed for the magnetic mark. Thus, any reasonable deviation can be handled. The spots are thus provided with magnetisable particles, which can be provided with magnetic marks, and, as will be further elucidated below, depending on the form and size of the spots, be provided with more complex information by modulated magnetisation. The packaging material is preferably a laminate, or a single layer material such as a polymer material. The magnetisable portions 102 are provided by a magnetisable ink, as demonstrated above, by for example printing. The packing material can comprise a laminate which can comprise a layer of paper, on which the printing of the magnetisable portions 102 can be made, and one or more layers of plastic coating. Here, the term plastic coating should be construed as any coating including suitable polymers for food containers. The packing laminate can also comprise a metal foil layer. To be able to write and read the magnetic mark through the metal foil layer, the metal is preferably non-ferromagnetic, such as aluminium. The print of the magnetisable portions is preferably made on a side of the layer it is printed on of the laminate facing towards the intended interior of the package to be formed. Thus, it does not interfere with exterior printing of e.g. decorations or product information on the package. The print is preferably made by using the magnetisable ink as demonstrated above.

The invention claimed is:

1. A web or sheet of a packaging laminate for reforming into a plurality of packaging containers for food through folding and sealing, the packaging laminate comprising:
   a base layer of paper or paperboard;
   at least one layer of plastic coating; and
   a plurality of spaced apart print marks of a magnetisable ink, the print marks of the magnetisable ink being spaced apart so that there is at least one print mark of the magnetizable ink per packaging container;
   the magnetisable ink comprising magnetisable particles, a solvent, an antifoaming agent additive, and a binder to disperse the magnetisable particles and to ensure adhesion to the packaging laminate;
   the magnetisable particles possessing a size between 0.1 and 2.5 μm;
   the print marks of the magnetisable ink being applied directly to a surface of the base layer of the paper or paperboard;
   the binder being between 20 and 60 percent of the weight of the magnetisable ink;
   the magnetisable particles being between 15 and 40 percent of the weight of the magnetisable ink; and
   the antifoaming agent additive comprising silicone or mineral oil.

2. The web or sheet of a packaging laminate according to claim 1, wherein the amount of binder is between 50 and 55 percent of weight of the magnetisable ink.

3. The web or sheet of a packaging laminate according to claim 1, wherein the amount of magnetisable particles is 30-35 percent by weight of the magnetisable ink.

4. The web or sheet of a packaging laminate according to claim 1, wherein the size of the magnetisable particles is between 0.4 and 1.5 μm.

5. The web or sheet of a packaging laminate according to claim 1, wherein the binder is chosen from the group consisting of acrylate, acrylics such as styrene acrylic copolymer, polyurethane, nitrocellulose, polyamide and latex.

6. The web or sheet of a packaging laminate according to claim 1, wherein the magnetisable ink further comprises a wax additive.

7. A web or sheet of a packaging laminate for reforming into a plurality of packaging containers for food through folding and sealing, the packaging laminate comprising:
   a base layer of paper or paperboard;
   at least one layer of plastic coating;
   a plurality of spaced apart print marks of a magnetisable ink, the print marks of the magnetisable ink being spaced apart so that there is at least one print mark of the magnetisable ink per packaging container;
   the magnetisable ink comprising magnetisable particles, a solvent, an antifoaming agent additive, and a binder to disperse the magnetisable particles and to ensure adhesion to the packaging laminate;
   the magnetisable particles possessing a size between 0.1 and 2.5 μm;
   the print marks of the magnetisable ink being applied directly to a surface of the base layer of the paper or paperboard;
   the binder being between 20 and 60 percent of the weight of the magnetisable ink; and
   the magnetisable particles being between 15 and 40 percent of the weight of the magnetisable ink.

8. The web or sheet of a packaging laminate according to claim 7, wherein the amount of binder is between 50 and 55 percent of weight of the magnetisable ink.

9. The web or sheet of a packaging laminate according to claim 7, wherein the amount of magnetisable particles is 30-35 percent by weight of the magnetisable ink.

10. The web or sheet of a packaging laminate according to claim 7, wherein the size of the magnetisable particles is between 0.4 and 1.5 μm.

11. The web or sheet of a packaging laminate according to claim 7, wherein the binder is chosen from the group consisting of acrylate, acrylics such as styrene acrylic copolymer, polyurethane, nitrocellulose, polyamide and latex.

12. The web or sheet of a packaging laminate according to claim 7, wherein the magnetisable ink further comprises a wax additive.

13. A web or sheet of a packaging laminate for reforming into a plurality of packaging containers for food through folding and sealing, the packaging laminate comprising:
   a base layer of paper or paperboard;
   at least one layer of plastic coating;
   a plurality of spaced apart print marks of a magnetisable ink, the print marks of the magnetisable ink being spaced apart so that there is at least one print mark of the magnetisable ink per packaging container;
   the magnetisable ink comprising magnetisable particles, a solvent and a binder to disperse the magnetisable particles and to ensure adhesion to the packaging laminate;
   the magnetisable particles possessing a size between 0.1 and 2.5 μm; and
   the print marks of the magnetisable ink being applied directly to a surface of the base layer of the paper or paperboard.

14. The web or sheet of a packaging laminate according to claim 13, wherein the amount of binder is between 50 and 55 percent of weight of the magnetisable ink.

15. The web or sheet of a packaging laminate according to claim 13, wherein the amount of magnetisable particles is 30-35 percent by weight of the magnetisable ink.

16. The web or sheet of a packaging laminate according to claim 13, wherein the size of the magnetisable particles is between 0.4 and 1.5 μm.

17. The web or sheet of a packaging laminate according to claim 13, wherein the binder is chosen from the group consisting of acrylate, acrylics such as styrene acrylic copolymer, polyurethane, nitrocellulose, polyamide and latex.

18. The web or sheet of a packaging laminate according to claim 13, wherein the magnetisable ink further comprises a wax additive.

19. The web or sheet of a packaging laminate according to claim 13, wherein the magnetisable ink further comprises an antifoaming agent additive.

* * * * *